United States Patent [19]
Musseau et al.

[11] Patent Number: 5,207,506
[45] Date of Patent: May 4, 1993

[54] DEVICE FOR EXTRACTING PASTE IN PARTICULAR FROM A KNEADING MACHINE HAVING A CYLINDRICAL VESSEL

[75] Inventors: Joel Musseau; Bruno Paturel; Claude Rochez, all of Aubusson, France

[73] Assignee: Dito-Sama, Aubusson, France

[21] Appl. No.: 661,540

[22] Filed: Feb. 27, 1991

[30] Foreign Application Priority Data

Mar. 14, 1990 [FR] France .................. 90 03250

[51] Int. Cl.⁵ .................. B28C 1/16; B01F 15/02; B01F 13/04
[52] U.S. Cl. .................. 366/095; 366/77; 366/188; 366/347; 366/601
[58] Field of Search .......... 366/53, 56, 60, 65, 366/77, 80, 92-95, 184, 187, 188, 192-195, 200, 201, 206, 220-224, 247, 249, 251, 252, 347, 601; 222/162, 168

[56] References Cited

U.S. PATENT DOCUMENTS

| | | | |
|---|---|---|---|
| 339,433 | 4/1886 | Lalley | 366/188 |
| 694,903 | 3/1902 | Wynn | 222/168 |
| 988,841 | 4/1911 | Wakefield | 222/168 |
| 993,557 | 5/1911 | Scott | 366/188 |
| 1,006,407 | 10/1911 | Ross | 222/168 |
| 1,354,326 | 9/1920 | Moore | 368/188 |
| 2,405,707 | 8/1946 | Nielson | 366/200 |
| 2,711,270 | 6/1955 | Gulbrandsen | 222/162 |
| 3,875,423 | 4/1975 | Kemper | 366/94 |
| 4,423,961 | 1/1984 | Steiner | 366/188 |
| 4,516,859 | 5/1985 | Spengler | 366/77 |
| 4,560,283 | 12/1985 | Eirich | 366/188 |
| 4,765,746 | 8/1988 | Purg | 366/77 |
| 4,863,278 | 9/1989 | Otto | 366/347 |
| 4,900,160 | 2/1990 | Brooks | 366/347 |
| 4,919,539 | 4/1990 | Drocco | 366/94 |
| 4,968,149 | 11/1990 | Loiselet | 366/77 |

FOREIGN PATENT DOCUMENTS

0300871 1/1989 European Pat. Off. .

Primary Examiner—Harvey C. Hornsby
Assistant Examiner—Terrence R. Till
Attorney, Agent, or Firm—Wenderoth, Lind & Ponack

[57] ABSTRACT

A device is provided for extracting paste from a kneading machine, in particular a kneading machine having a cylindrical vessel with a vertical axis of rotation, provided with a spiral type kneading tool which has a vertical axis and is mounted eccentrically relative to the axis of rotation of the vessel and which is driven by a driving device partly disposed in a housing in alignment with the tool. This device comprises a withdrawable paste extractor having an intermediate position of equilibrium between a working position and a withdrawn position, and a pivotable main cover having a shape complementary to the shape of the extractor so as to prevent access to the vessel when the extractor is in the intermediate position of equilibrium or the working position.

26 Claims, 5 Drawing Sheets

DEVICE FOR EXTRACTING PASTE IN PARTICULAR FROM A KNEADING MACHINE HAVING A CYLINDRICAL VESSEL

BACKGROUND OF THE INVENTION

The present invention relates to a device for extracting paste in particular from a kneading machine having a cylindrical vessel with a tool having a vertical axis of rotation. There is known from the French Patent Application No. 87 09710 in the name of the applicant, a paste extracting device for a kneading machine and in particular for a kneading machine with a kneading tool having an oblique axis. In this case, the kneading machine comprises an extractor disposed laterally so as to cooperate with the wall of the vessel, the shape of the extractor ensuring the extraction of the paste along the extractor from the bottom of the vessel to the exterior of the vessel by a combination of the static position of the extractor and the displacement of the paste driven by the vessel. In the case of kneading machines with a kneading tool having an oblique axis, practically the whole of the vessel is accessible to the user.

In order to limit access to the interior of this vessel in operation, there is provided a movable cover, usually a grill, which is positioned immediately above the vessel so as to allow only a narrow passage for the extractor when the latter is in the working position.

Indeed, in this embodiment, it is arranged that the extractor be capable of assuming either of two specific positions, namely one a completely withdrawn position of equilibrium on the rear of the machine, and the other a working position, i.e. in close cooperation with the vessel. For the passage from the rear position of equilibrium to the working position, it is first of all necessary to stop the kneading machine, raise the cover, lower the extractor and put the cover back into position before again operating the kneading machine. There is therefore a discontinuity in the operation and it is impossible to lower the extractor with the cover in the closing position and, even if the user does not stop operation of the kneading machine, the mere fact of raising the cover actuates safety means which immediately stop operation of the kneading machine.

SUMMARY OF THE INVENTION

An object of the present invention is to provide an improvement in the extracting device of the aforementioned patent application which is applicable in particular in the case of kneading machines with a cylindrical vessel having a vertical axis of rotation and a kneading tool which has a vertical axis and is of the spiral type.

This improvement permits causing the extractor itself to participate as a cover for the protection and safety so as to limit access to the vessel during operation of the kneading machine.

To this end, the invention provides a paste extracting device of a kneading machine with a cylindrical vessel and a vertical axis of rotation provided with a kneading tool which has a vertical axis and is of the spiral type, the tool being mounted in an eccentric manner with respect to the axis of rotation of the vessel and driven by driving means partly disposed in a head in alignment with the tool. The invention is characterized in that it comprises a withdrawable paste extractor with an intermediate equilibrium position between a working position and a retracted position, and a movable cover having a shape complementary to the shape of the extractor so as to preclude access to the vessel when the extractor is in the intermediate equilibrium position or in the working position.

According to a particular characteristic, the extractor is lateral and mounted relative to the head of the kneading machine to pivot about a horizontal shaft.

According to another characteristic, the extractor of the device comprises a curved portion forming a passage which closely cooperates with the edge and the bottom of the vessel and an arm connecting the curved portion to the shaft of rotation. More particularly, the extractor comprises at least one protecting cover which cooperates with the movable screen so as to preclude access to the interior of the vessel when the extractor is in the lowered position.

According to other characteristics, the extractor comprises a shifting handle which is accessible irrespective of the position of the extractor. The extractor further comprises force compensating means with a point of equilibrium corresponding to the intermediate position.

It is also arranged that the device comprise electric safety means which stop the driving means when the extractor and/or the cover are in the raised position above the intermediate position.

BRIEF DESCRIPTION OF THE DRAWINGS

The invention will be described hereinafter with respect to one embodiment with reference to the accompanying drawings, in which.

DETAILED DESCRIPTION OF THE INVENTION

Figure 1:
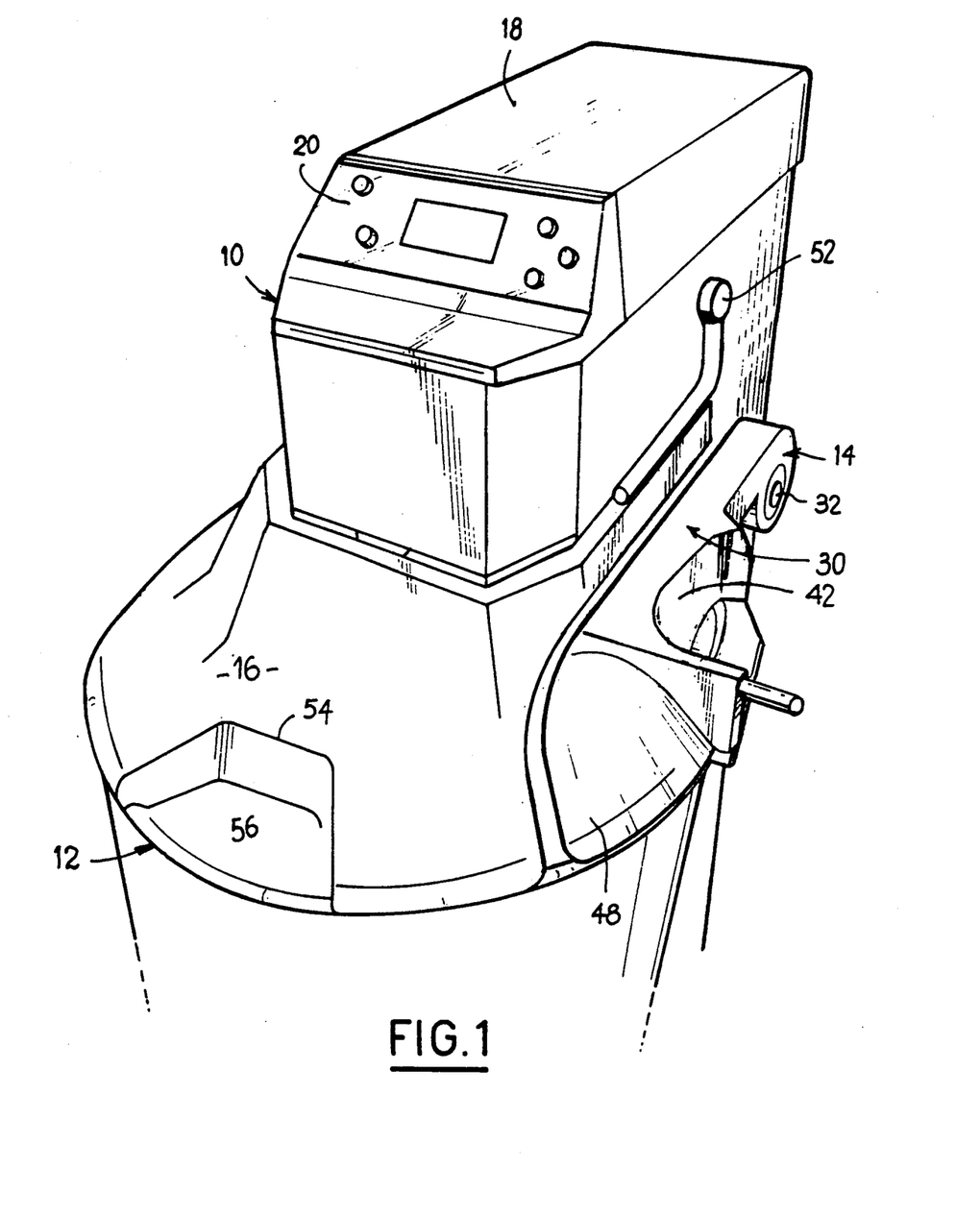
FIG. 1 is a perspective view of a kneading machine with a movable vessel and a tool having a vertical axis of rotation according to the invention, the tool and a cover being in the working position.

FIG. 1 shows a kneading machine 10 with a movable vessel 12, an extractor 14 and a movable protecting cover (or main cover) 16.

Hereinafter, "working position" of the extractor is intended to mean the position in which it extracts the paste, i.e. the completely lowered position, and "intermediate position" is intended to mean the position in which the extractor cooperates with the main cover to ensure safety of operation, the extractor being out of contact with the paste.

The kneading machine comprises a head (or housing) 18 within which is disposed a part of the driving means D in a known manner and not shown in detail, while on the front side of the head a control panel 20 accessible to the user permits the user to control the kneading machine.

Figure 2:
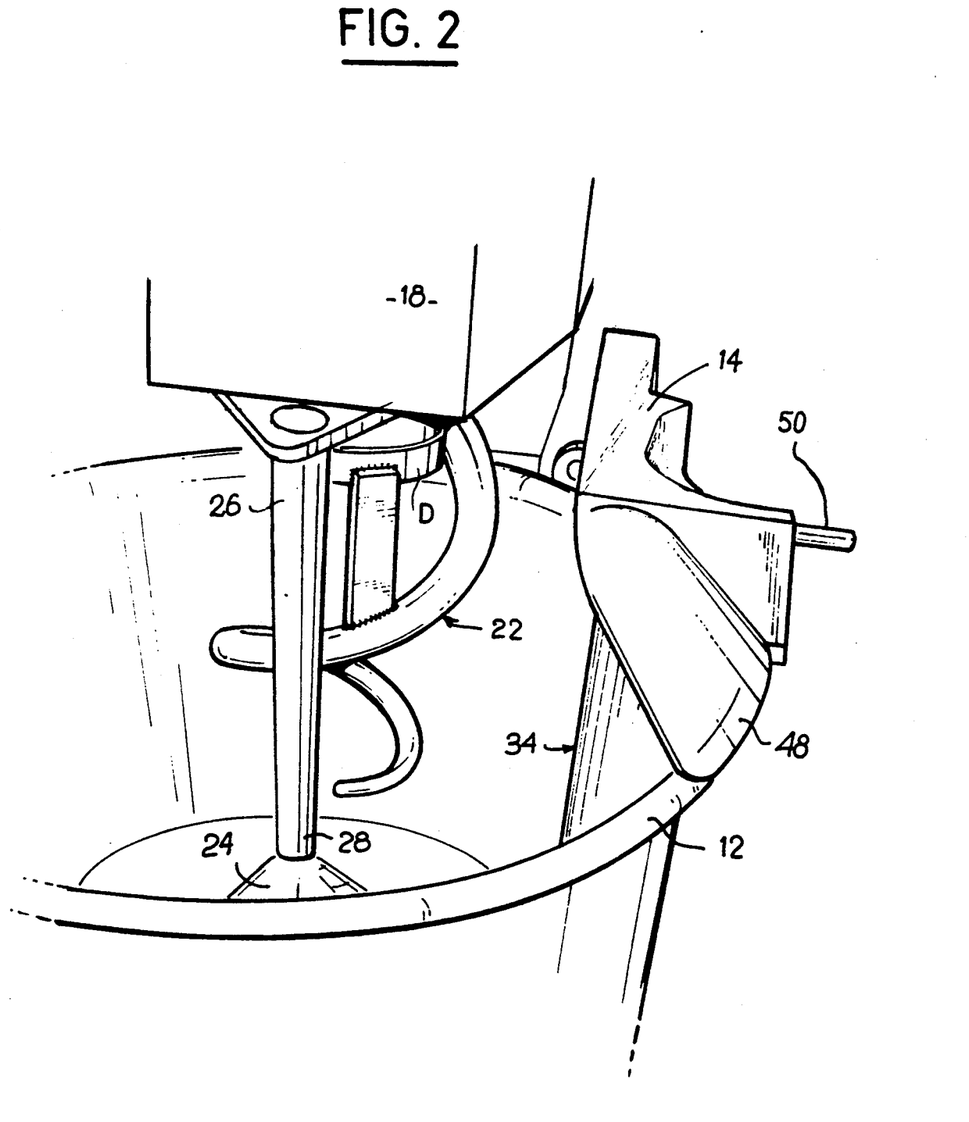
FIG. 2 is a partial perspective view of the kneading machine of FIG. 1 with the extractor in the working position and the cover raised.

As shown in more detail in FIG. 2, the head 18 comprises a tool 22 rotatably mounted relative to this head and driven by the aforementioned driving means. This tool 22 is of the spiral type and, when it rotates, it kneads the substances introduced into the vessel 12.

This tool 22 is mounted eccentric with respect to the center of the vessel 12 represented in FIG. 2 by a projecting cone 24 which is centered with respect to the axis of rotation of the vessel 12.

Further, a central substantially cylindrical bar 26 is mounted on the head 18 in proximity to the axis of rotation of the vessel, the lower end 28 of this bar constituting an abutment in the immediate vicinity of the cone 24.

The vessel 12 is of the cylindrical type having vertical sides and is usually made from stainless steel. This vessel is driven in its lower part in the known manner by the driving means of the kneading machine so that the contents of the vessel are subjected to a double movement of rotation of the vessel and rotation of the tool 22.

The extractor 14 comprises an arm 30 mounted to rotate about a horizontal shaft 32 perpendicular to the lateral face of the head 18.

Figure 3:
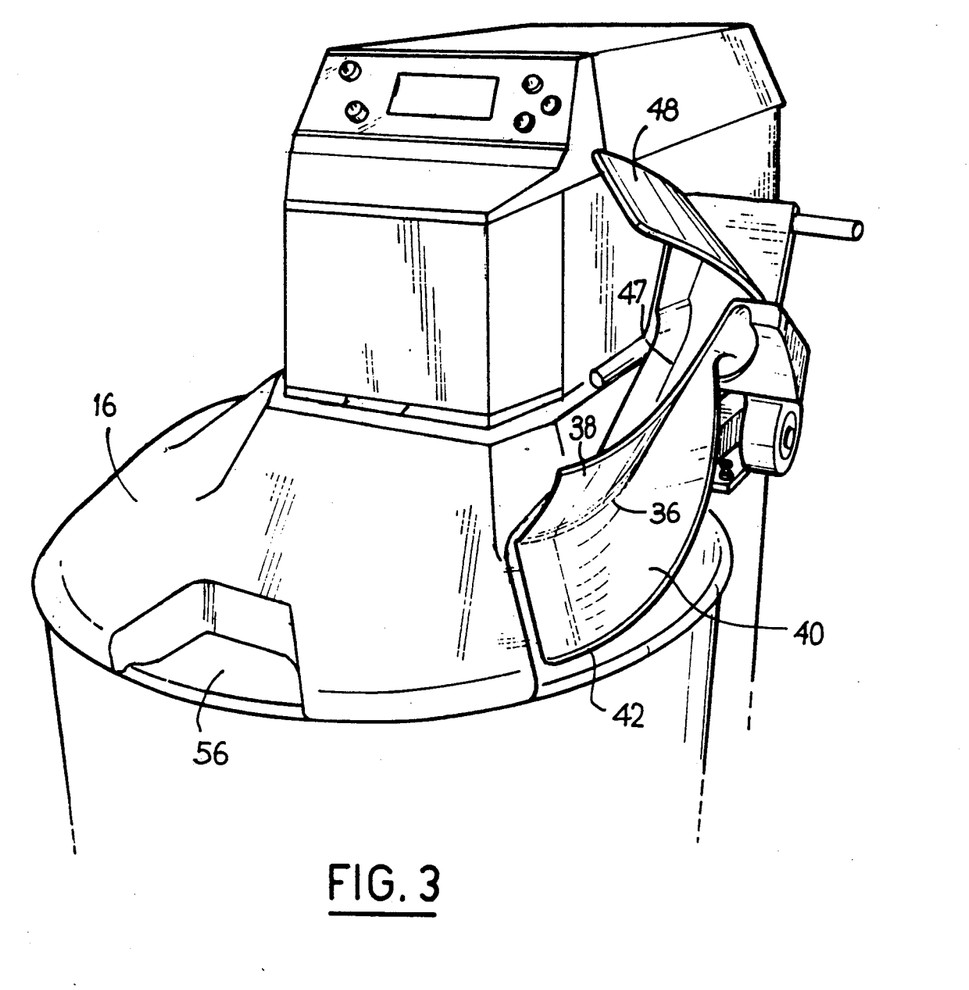
FIG. 3 is a perspective view similar to FIG. 1 with the extractor in the intermediate position.
Figure 4:
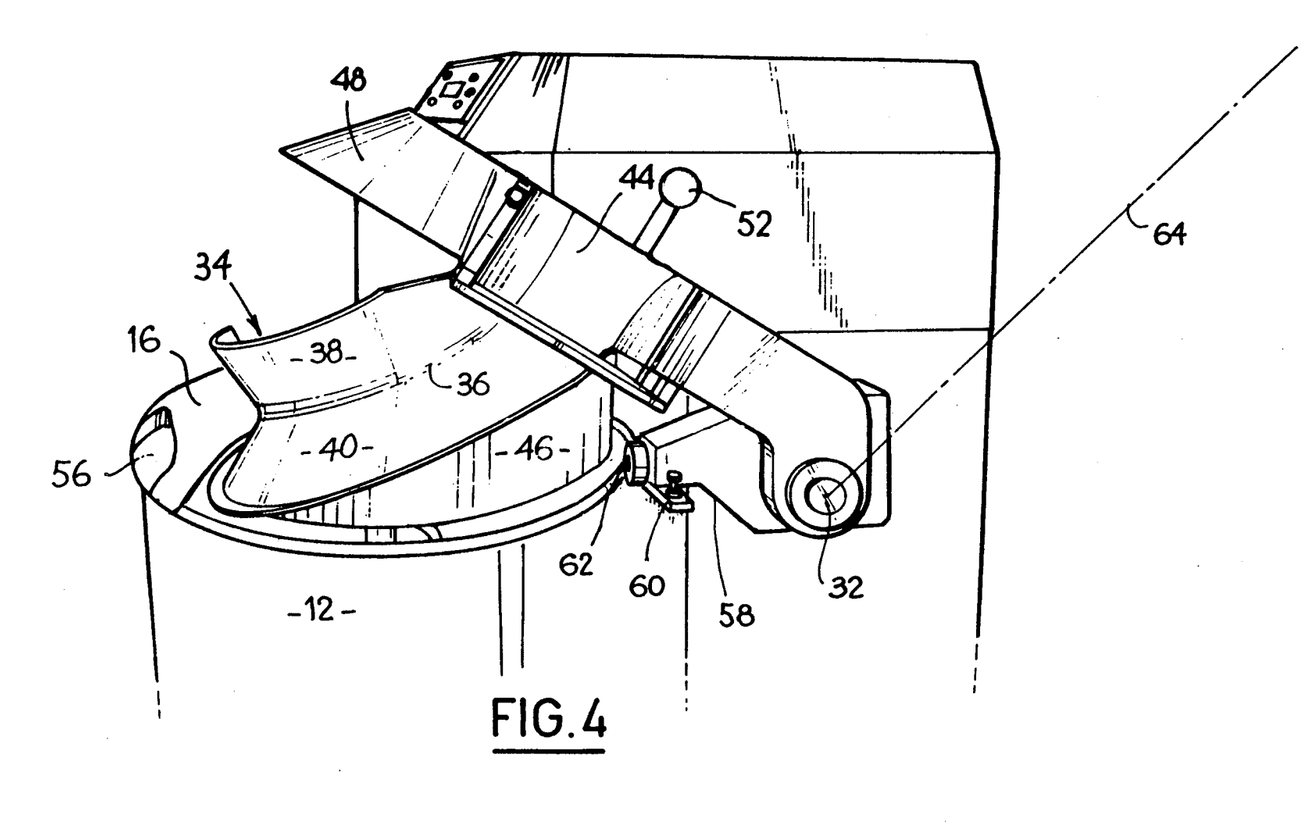
FIG. 4 is a perspective view of the side of the kneading machine of FIG. 3.

At the end of the arm 14, substantially in the region of the bar 26, the extractor comprises a group of shaped elements 34 which, as is shown better in FIGS. 3 and 4, comprises an extracting passage 36 formed by two flanges 38 and 40. The flange 40 frictionally cooperates with the inner wall surface of the vessel due to the provision of a sealing element 42. The paste is discharged to the exterior of the vessel in the upper part through an opening 44. The group of shaped elements 34 also includes a second cover (or intermediate position cover means) 46 arranged to be substantially parallel to the lateral face of the head 18 of the kneading machine so that the free space ,between the arm 30 of the extractor 14 and the vessel 12 is covered when the extractor is in the intermediate position shown in FIG. 4, and an additional cover 47 disposed toward the interior and toward the upper part so that the free space between the extractor and the head of the kneading machine is covered (FIG. 3).

Further, the group of shaped elements 34 is completed by a 48 disposed first cover (or working position cover means) as an extension of the arm 30 so as to close off the space between the extractor and the main cover 16 when the extractor is in the working position, as shown in FIG. 1.

A handling handle 50 is fixed to the extractor, this handle remaining accessible to the user irrespective of the position of the extractor.

The main cover 16 is mounted to pivot about two pins 52 disposed on each side of the head 18 so that the main cover may be withdrawn by rotation about the pins 52 to a position above the head 18. In its working (or covering) position, the main cover 16 is disposed, as shown in FIGS. 1, 3 and 4, immediately above the vessel so as to prevent access to the tool 22.

This screen 16 also includes a recess 54 diametrically opposed to the tool with respect to the bar 26 so as to clear a passage 56 which permits partial access to the vessel through which the user may, if desired, remove a certain amount of paste or add ingredients.

The main cover which is shown in the form a solid wall, may be made in the form of a grill so as to enable the user to supervise the working of the paste.

Figure 5:
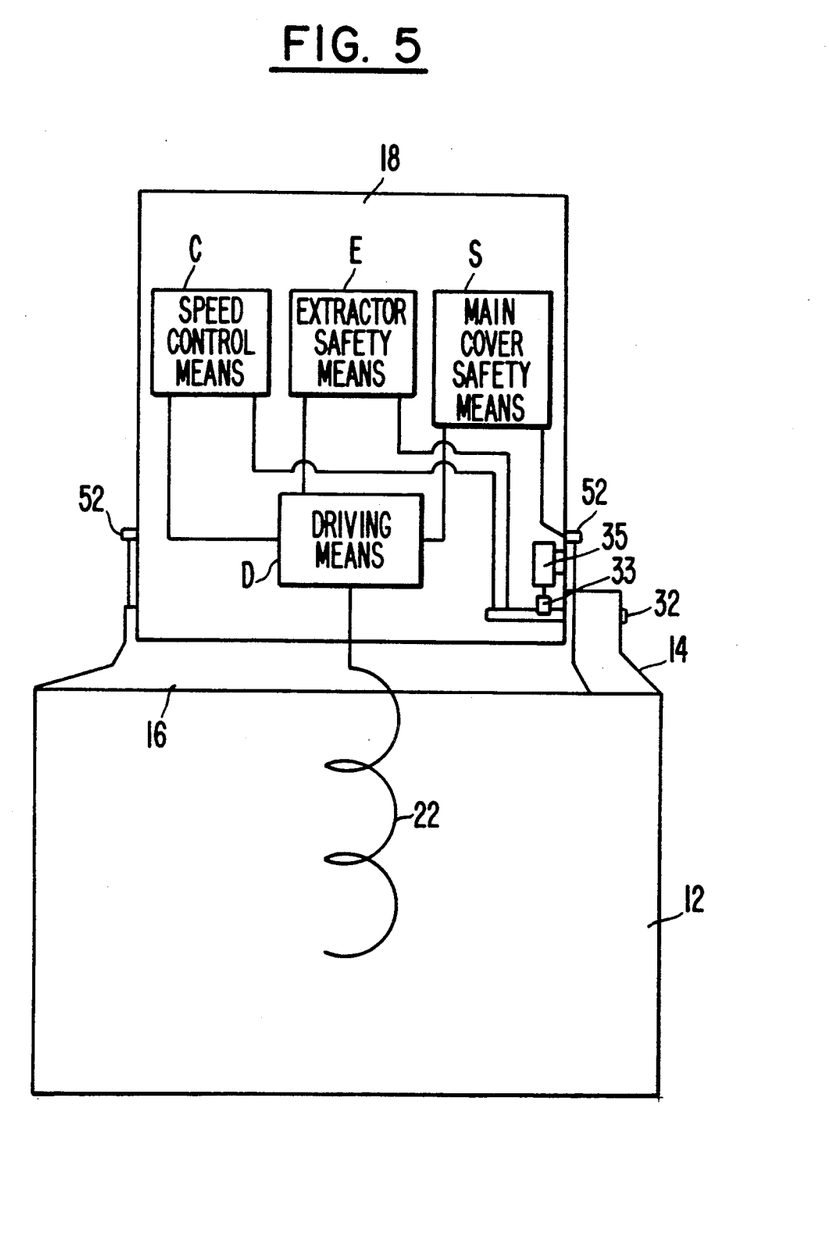
FIG. 5 is a schematic diagram showing various control elements in the kneading machine.

The extractor is completed by a group of stops 58, as shown in FIG. 4, which includes a first stop 60 allowing for fine adjustment of the vertical position of the arm 30 and associated extractor with respect to the vessel, and a second stop 62, of the roller type, which braces against strain undergone by the arm when extracting the paste, which tends to move this arm away from the vessel. The shaft 32 is connected to a force compensating means having a point of equilibrium and disposed inside the frame. Such force compensating means usually comprises a tab 53 rigid with the shaft 32 and perpendicular to the latter, the end of the tab 33 being connected to a force compensating cylinder device 35 of a known type (refer to FIG. 5).

The extractor may take up an intermediate position such as that shown in FIGS. 3 and 4. The extractor may take up a stable withdrawn position when the arm 30 is parallel to the dot-dash line 64 as diagrammatically represented in FIG. 4, which is in particular used during the cleaning and maintenance of the machine.

The third position of equilibrium which the extractor may take up is the position shown in FIGS. 1 and 2, i.e. the working position.

Further, the kneading machine shown in FIGS. 1 to 4 comprises electric safety means E5 which stop the driving means when the extractor 14 and/or the main cover 16 are in raised positions. These electric means employ, in this embodiment, switches controlled by cams mounted on the rotating shafts 32 and 52.

The kneading machine according to the invention operates in the following manner:

With the kneading machine inoperative, the user pours into the vessel 12 the ingredients for forming the paste. He then lowers the main cover 16 so that the latter assumes the working position over the vessel 12 and leaves only the passage 56.

The extractor 14 is also pivoted from the withdrawn position in which the arm 30 is parallel to the dot-dash line 64 to the intermediate position shown in FIGS. 3 and 4. The order in which the screen and the extractor may be placed in position may be reversed with no inconvenience.

The kneading machine is started up by means of the control panel 20 and this causes the simultaneous rotation of the vessel 12 and the spiral tool 22 which effect the kneading. The paste formed is spread substantially along a circle due to the central bar 26. The paste is in this way kneaded until it has the desired consistency. Due to the action of the covers 46, 47 and to the main cover 16 and the extractor itself, the extractor prevents the user from having access to the tool 22. If the user raises the extractor 14 and/or the main cover 16, this immediately causes stoppage of the kneading machine. When the paste must be discharged from the vessel, the user exerts a downward force on the handle 50 so as to overcome the position of equilibrium, lower the extractor and cause it to penetrate the paste. The user applies this force until the extractor comes into contact with the paste. The latter exerts a force on the extractor which automatically positions the extractor by causing it to bear against the stop 60. In this working position, access to the interior of the vessel adjacent to the extractor is prevented by the arm 30 and the third screen 48.

This type of extractor having an intermediate position and complementary covers connected to the extractor is applicable to all kneading machines and increases the flexibility of utilization since the extractor may be shifted, without interruption in the operation of the kneading machine, from the intermediate position to the working position and vice versa when the user effects a partial discharge of the paste.

The main cover 16 is pivotable about a horizontal axis but, as a variant, it may be pivotable about a vertical axis or mounted so as to be movable in vertical translation relative to the head.

In a variant of the invention, the positionings of the extractor may be carried out automatically by means of, for example, a hydraulic cylinder device which may assume a fixed position intermediate two end positions which corresponds to the intermediate position in which the extractor cooperates with the main cover 16 due to the covers 46 and 47.

Further, the kneading machine, and more precisely the tool, may also be slowed down or stopped by a control means (ie. a speed control means C) C associated with the tool during the extracting stage (i.e. the tool may be automatically slowed down or stopped by the speed control means C when the extractor moves from the intermediate position to the working position) so as to avoid modifying the quality of the kneading between the start and the end of this extracting stage.

In this case, that is, passing from the intermediate position to the working position of the extractor automatically causes the slowing down of the tool.

What is claimed is:

1. A device for use with a kneading machine having a housing, a cylindrical vessel rotatable relative to the housing about a first vertical axis, a spiral kneading tool rotatable about a second vertical axis offset from the first vertical axis, and driving means mounted to the housing for rotating the kneading tool, said device comprising:
   a main cover having an edge with a first predetermined configuration;
   main cover pivot means for pivotably mounting said main cover to the housing for movement between a covering position in which said main cover is adapted to cover a major portion of the cylindrical vessel, and an access position spaced from said covering position wherein said main cover is adapted to allow access to the cylindrical vessel;
   an extractor arm having an edge with a second predetermined configuration complementary to said first predetermined configuration;
   extractor arm pivot means for pivotably mounting said extractor arm to the housing for movement between a working position in which said extractor arm is adjacent to said main cover when said main cover is in said covering position such that said edges of said main cover and said extractor arm are in a complementary relationship with on another, and a withdrawn position;
   paste extractor means, fixed to and extending from said extractor arm, for extracting paste from the cylindrical vessel when said extractor arm is in said working position;
   a working position cover means for covering, when said extractor arm is in said working position, a portion of the cylindrical vessel not covered by said main cover when said main cover is in said covering position; and
   wherein said main cover pivot means and said extractor arm pivot means are respectively operable to mount said main cover and said extractor arm to the housing such that said main cover and said extractor arm are pivotable independently of one another and wherein said first predetermined configuration of said edge of said main cover and said second predetermined configuration of said edge of said extractor arm are such as to allow said extractor arm and said main cover to pass by one another when pivoted relative to one another.

2. A device as recited in claim 1, wherein
said extractor arm pivot means further pivotably mounts said extractor arm to the housing such that said extractor arm is pivotable to an intermediate position between said working position and said withdrawn position; and
an intermediate position covering means is associated with said extractor arm for covering, when said extractor arm is in said intermediate position, the portion of the cylindrical vessel not covered by said main cover when said main cover is in said covering position.

3. A device as recited in claim 2, wherein
said paste extractor means comprises an extracting passage formed by a pair of interconnected flanges fixed to said extractor arm, said extracting passage leading to an opening formed in said extractor arm to allow passage of paste therethrough.

4. A device as recited in claim 3, wherein
said working position cover means comprises a first cover fixed to said extractor arm; and
said intermediate position cover means comprises a portion of one of said flanges forming said extracting passage, and a second cover fixed to said one of said flanges.

5. A device as recited in claim 1, wherein
said extractor arm pivot means comprises a horizontal shaft mounted to said extractor arm.

6. A device as recited in claim 1, further comprising
force compensating means, operably connected with said extractor arm, for compensating for forces incident on said extractor arm.

7. A device as recited in claim 1, further comprising
first stop means for limiting pivoting movement of said extractor arm to define said working position thereof; and
second stop means for bracing said extractor arm against strain due to forces incident thereon.

8. A device as recited in claim 24, wherein
said second stop means comprises a roller.

9. A device as recited in claim 1, wherein
said main cover pivot means comprises means for pivotably mounting said main cover to the housing for pivoting about a horizontal axis.

10. A device as recited in claim 1, further comprising
extractor safety means for stopping the driving means when said extractor arm is in at least one of said withdrawn position and said intermediate position.

11. A device as recited in claim 1, further comprising
main cover safety means for stopping the drilling means when said main cover is in said access position.

12. A device for use with a kneading machine having a housing, a cylindrical vessel rotatable relative to the housing about a first vertical axis, a spiral kneading tool rotatable about a second vertical axis offset from the first vertical axis, and driving means mounted to the housing for rotating the kneading tool, said device comprising:
   a main cover having an edge with a first predetermined configuration;
   main cover pivot means for pivotably mounting said main cover to the housing for movement between a covering position in which said main cover is adapted to cover a major portion of the cylindrical vessel, and an access position spaced from said covering position wherein said main cover is adapted to allow access to the cylindrical vessel;

an extractor arm having an edge with a second predetermined configuration complementary to said first predetermined configuration;

extractor arm pivot means for pivotably mounting said extractor arm to the housing for movement between a working position in which said extractor arm is adjacent to said main cover when said main cover is in said covering position such that said edges of said main cover and said extractor arm are in a complementary relationship with one another, and a withdrawn position;

paste extractor means, fixed to and extending from said extractor arm, for extracting paste from the cylindrical vessel when said extractor arm is in said working position;

wherein said extractor arm pivot means further pivotably mounts said extractor arm to the housing such that said extractor arm is pivotable to an intermediate position between said working position and said withdrawn position;

wherein an intermediate position covering means is associated with said extractor arm for covering, when said extractor arm is in said intermediate position, a portion of the cylindrical vessel not covered by said main cover when said main cover is in said covering position; and wherein said main cover pivot means and said extractor arm pivot means are respectively operable to mount said main cover and said extractor arm to the housing such that said main cover and said extractor arm are pivotable independently of one another and wherein said first predetermined configuration of said edge of said main cover and said second predetermined configuration of said edge of said extractor arm are such as to allow said extractor arm and said main cover to pass by one another when pivoted relative to one another.

13. A device for use with a kneading machine having a housing, a cylindrical vessel rotatable relative to the housing about a first vertical axis, a spiral kneading tool rotatable about a second vertical axis offset from the first vertical axis, and driving means mounted to the housing for rotating the kneading tool, said device comprising:

a main cover having an edge with a first predetermined configuration;

main cover pivot means for pivotably mounting said main cover to the housing for movement between a covering position in which said main cover is adapted to cover a major portion of the cylindrical vessel, and an access position spaced from said covering position wherein said main cover is adapted to allow access to the cylindrical vessel;

an extractor arm having an edge with a second predetermined configuration complementary to said first predetermined configuration;

extractor arm pivot means for pivotably mounting said extractor arm to the housing for movement between a working position in which said extractor arm is adjacent to said main cover when said main cover is in said covering position such that said edges of said main cover and said extractor arm are in a complementary relationship with one another, and a withdrawn position;

paste extractor means, fixed to and extending from said extractor arm, for extracting paste from the cylindrical vessel when said extractor arm is in said working position;

speed control means for automatically slowing rotating of the tool when said extractor arm is moved from said intermediate position to said working position; and wherein said main cover pivot means and said extractor arm pivot means are respectively operable to mount said main cover and said extractor arm to the housing such that said main cover and said extractor arm are pivotable independently of one another and wherein said first predetermined configuration of said edge of said main cover and said second predetermined configuration of said edge of said extractor arm are such as to allow said extractor arm and said main cover to pass by one another when pivoted relative to one another.

14. A device comprising:

a kneading machine having a housing, a cylindrical vessel rotatable relative to said housing about a first vertical axis, a spiral kneading tool rotatable about a second vertical axis offset from said first vertical axis, and driving means mounted to said housing for rotating said kneading tool;

a main cover having an edge with a first predetermined configuration;

main cover pivot means for pivotally mounting said main cover to said housing for movement between a covering position in which said main cover covers a major portion of said cylindrical vessel, and an access position spaced from said covering position wherein said main cover allows access to said cylindrical vessel;

an extractor arm having an edge with a second predetermined configuration complementary to said first predetermined configuration;

extractor arm pivot means for pivotably mounting said extractor arm to said housing for movement between a working position in which said extractor arm is adjacent to said main cover when said main cover is in said covering position such that said edges of said main cover and said extractor arm are in a complementary relationship with one another, and a withdrawn position;

paste extractor means, fixed to and extending from said extractor arm, for extracting paste from said cylindrical vessel when said extractor arm is in said working position;

a working position cover means for covering, when said extractor arm is in said working position, a portion of said cylindrical vessel not covered by said main cover when said main cover is in said covering position; and wherein said main cover pivot means and said extractor arm pivot means are respectively operable to mount said main cover and said extractor arm to said housing such that said main cover and said extractor arm are pivotable independently of one another, and wherein said first predetermined configuration of said edge of said main cover and said second predetermined configuration of said edge of said extractor arm are such as to allow said extractor arm and said main cover to pass by one another when pivoted relative to one another.

15. A device as recited in claim 14, wherein said extractor arm pivot means further pivotably mounts said extractor arm to the housing such that said extractor arm is pivotable to an intermediate position between said working position and said withdrawn position; and an intermediate position covering means is associated with said extractor arm for covering, when said extractor arm is in said intermediate position, said portion of said cylindrical vessel not covered by said main cover when said main cover is in said covering position.

16. A device as recited in claim 15, wherein
said paste extractor means comprises an extracting passage formed by a pair of interconnected flanges fixed to said extractor arm, said extracting passage leading to an opening formed in said extractor arm to allow passage of paste therethrough.

17. A device as recited in claim 16, wherein
said working position cover means comprises a first cover fixed to said extractor arm; and
said intermediate position cover means comprises a portion of one of said flanges forming said extracting passage, and a second cover fixed to said one of said flanges.

18. A device comprising:
a kneading machine having a housing, a cylindrical vessel rotatable relative to said housing about a first vertical axis, a spiral kneading tool rotatable about a second vertical axis offset from said first vertical axis, and driving means mounted to said housing for rotating said kneading tool;
a main cover having an edge with a first predetermined configuration;
main cover pivot means for pivotably mounting said main cover to said housing for movement between a covering position in which said main cover covers a major portion of said cylindrical vessel, and an access position spaced from said covering position wherein said main cover allows access to said cylindrical vessel;
an extractor arm having an edge with a second predetermined configuration complementary to said first predetermined configuration;
extractor arm pivot means for pivotably mounting said extractor arm to said housing for movement between a working position in which said extractor arm is adjacent to said main cover when said main cover is in said covering position such that said edges of said main cover and said extractor arm are in a complementary relationship with one another, and a withdrawn position;
paste extractor means, fixed to and extending from said extractor arm, for extracting paste from said cylindrical vessel when said extractor arm is in said working position;
wherein said extractor arm pivot means further pivotably mounts said extractor arm to the housing such that said extractor arm is pivotable to an intermediate position between said working position and said withdrawn position;
wherein an intermediate position covering means is associated with said extractor arm for covering, when said extractor arm is in said intermediate position, a portion of said cylindrical vessel not covered by said main cover when said main cover is in said covering position; and
wherein said main cover pivot means and said extractor arm pivot means are respectively operable to mount said main cover and said extractor arm to said housing such that said main cover and said extractor arm are pivotable independently of one another, and wherein said first predetermined configuration of said edge of said main cover and said second predetermined configuration of said edge of said extractor arm are such as to allow said extractor arm and said main cover to pass by one another when pivoted relative to one another.

19. A device as recited in claim 14, wherein
said extractor arm pivot means comprises a horizontal shaft mounted to said extractor arm.

20. A device as recited in claim 14, further comprising
force compensating means, operably connected with said extractor arm, for compensating for forces incident on said extractor arm.

21. A device as recited in claim 14, further comprising
first stop means for limiting pivoting movement of said extractor arm to define said working position thereof; and
second stop means for bracing said extractor arm against strain due to forces incident thereon.

22. A device as recited in claim 21, wherein
said second stop means comprises a roller.

23. A device as recited in claim 14, wherein
said main cover pivot means comprises means for pivotably mounting said main cover to said housing for pivoting about a horizontal axis.

24. A device as recited in claim 14, further comprising
extractor safety means for stopping said driving means when said extractor arm is in at least one of said withdrawn position and said intermediate position.

25. A device as recited in claim 14, further comprising
main cover safety means for stopping said driving means when said main cover is in said access position.

26. A device comprising:
a kneading machine having a housing, a cylindrical vessel rotatable relative to said housing about a first vertical axis, a spiral kneading tool rotatable about a second vertical axis offset from said first vertical axis, and driving means mounted to said housing for rotating said kneading tool;
a main cover having an edge with a first predetermined configuration;
main cover pivot means for pivotably mounting said main cover to said housing for movement between a covering position in which said main cover covers a major portion of said cylindrical vessel, and an access position spaced from said covering position wherein said main cover allows access to said cylindrical vessel;
an extractor arm having an edge with a second predetermined configuration complementary to said first predetermined configuration;
extractor arm pivot means for pivotably mounting said extractor arm to said housing for movement between a working position in which said extractor arm is adjacent to said main cover when said main cover is in said covering position such that said edges of said main cover and said extractor arm are in a complementary relationship with one another, and a withdrawn position;
paste extractor means, fixed to and extending from said extractor arm, for extracting paste from said cylindrical vessel when said extractor arm is in said working position;

speed control means for automatically slowing rotation of said tool when said extractor arm is moved from said intermediate position to said working position; and wherein said main cover pivot means and said extractor arm pivot means are respectively operable to mount said main cover and said extractor arm to said housing such that said main cover and said extractor arm are pivotable independently of one another, and wherein said first predetermined configuration of said edge of said main cover and said second predetermined configuration of said edge of said extractor arm are such as to allow said extractor arm and said main cover to pass by one another when pivoted relative to one another.

* * * * *